(12) United States Patent
Hahn et al.

(10) Patent No.: US 7,389,297 B1
(45) Date of Patent: Jun. 17, 2008

(54) METHOD FOR EXIT NEGOTIATION WITH AGGREGATE APPLICATION DESCENDENTS

(75) Inventors: Stephen C. Hahn, Redwood City, CA (US); David E. Powell, Sunnyvale, CA (US); Michael W. Shapiro, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 589 days.

(21) Appl. No.: 10/932,786

(22) Filed: Sep. 2, 2004

(51) Int. Cl.
*G06F 17/30* (2006.01)
(52) U.S. Cl. ........................... 707/100; 707/200
(58) Field of Classification Search .......... 707/200, 707/206, 100
See application file for complete search history.

(56) References Cited

U.S. PATENT DOCUMENTS

| | | | | |
|---|---|---|---|---|
| 5,717,926 A | * | 2/1998 | Browning et al. | 718/104 |
| 5,815,727 A | * | 9/1998 | Motomura | 712/1 |
| 6,961,935 B2 | * | 11/2005 | Torii | 718/100 |
| 6,988,155 B2 | * | 1/2006 | Lary et al. | 710/260 |

* cited by examiner

*Primary Examiner*—Cheryl Lewis
(74) *Attorney, Agent, or Firm*—Osha Liang LLP

(57) ABSTRACT

A method for handling events in aggregate descendants including creating a process contract by a first process, executing a first operation in the first process, wherein a second process created by the first operation is added to the process contract, receiving a first event affecting the second process in the process contract, handling the first event in the first process, and killing the second process, if the first event is a fatal event.

20 Claims, 6 Drawing Sheets

METHOD FOR EXIT NEGOTIATION WITH AGGREGATE APPLICATION DESCENDENTS

BACKGROUND

A general issue when implementing application availability frameworks around an operating system process model (e.g., the UNIX process model) is how to track all of the descendants of an application's initial process. Historically, UNIX-derived operating systems have added new services in an organic fashion in response to new hardware capabilities, new forms of connectivity, or new application types. This approach has resulted in a collection of mostly independent processes providing a set of capabilities on each operating system. With the emergence of network connections and more complex hardware platforms, these processes have grown large networks of implicit or explicit dependencies that are not easily expressed in the process model offered by the operating system.

In typical UNIX-derived operating systems, a process only knows about the first generation of processes that descend from that process. A process is generally unaware of any descendants of this first generation. An approach to track additional levels of descendants is to use debugging or interposition techniques to modify the way an operating system creates one or more processes, such as the fork operation. Another approach is to use the /proc filesystem (i.e., the pseudo filesystem implementation of an operating system process model) to trace every creation (or re-creation) of a process, such as when the fork operation creates offspring. Existing UNIX process collectives, such as the process group, the session, or the task, may also be used to track descendants but these mechanisms either force the initial process to be the leader and the effective administration handle for the collective, or provide no observation model. Generally, when the initial process is the administration handle for the collective, if that process dies, all information regarding the descendants could be lost.

SUMMARY

In general, in one aspect, the invention relates to a method for handling events in aggregate descendants comprising creating a process contract by a first process, executing a first operation in the first process, wherein a second process created by the first operation is added to the process contract, receiving a first event affecting the second process in the process contract, handling the first event in the first process, and killing the second process, if the first event is a fatal event.

In general, in one aspect, the invention relates to a method for handling events in aggregate descendants comprising creating a process contract for a process, adding a plurality of descendant processes to the process contract, receiving a plurality of events affecting the plurality of descendant processes, handling the plurality of events in the process, receiving a fatal event affecting a descendant process in the plurality of descendant processes, and killing the plurality of descendant processes.

In general, in one aspect, the invention relates to a mechanism for handling events in aggregate descendants of a process comprising a process contract owned by the process, a plurality of descendant processes of the process, wherein each descendant process of the plurality of descendant processes is a member of the process contract, and a contract subsystem providing management of the process contract, wherein the contract subsystem provides events affecting the plurality of descendant processes to the process, and the process handles the events.

In general, in one aspect, the invention relates to a computer system enabled to handle events in aggregate descendants, comprising a processor, a memory operatively connected to the processor, and software instructions stored in the memory for enabling the computer system to: create a process contract by a first process, execute a first operation in the first process, wherein a second process created by the first operation is added to the process contract, receive a first event affecting the second process in the process contract, handle the first event in the first process, and kill the second process, if the first event is a fatal event.

Other aspects of the invention will be apparent from the following description and the appended claims.

DETAILED DESCRIPTION

Figure 1:
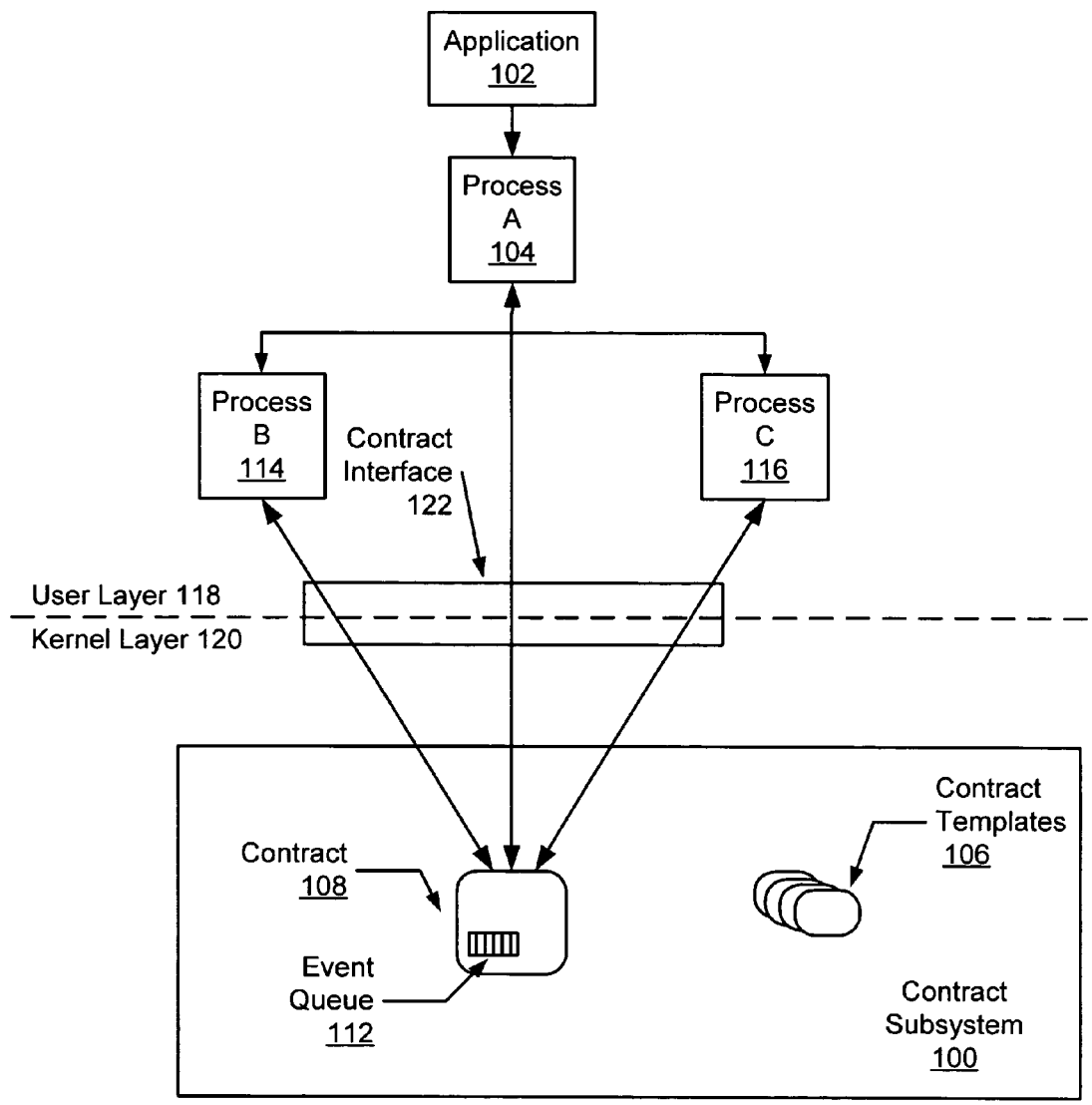
FIG. 1 shows a flow diagram in accordance with one embodiment of the invention.

Exemplary embodiments of the invention will be described with reference to the accompanying drawings. Like items in the drawings are shown with the same reference numbers.

In an embodiment of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

One or more embodiments of the invention relate to a method and apparatus allowing processes to observe and handle hardware and software failures in a tree of descendant processes. More specifically, a method and apparatus are provided for exit negotiation (i.e., handling hardware and software failures) with aggregate descendants of an application process.

The set of future processes, i.e., the aggregate descendants, of a process is treated as a bindable resource for which a contract may be written. The aggregate descendants of a process may include the child processes created by a parent process, e.g., those processes created by a fork operation in the parent process, and, optionally, some or all of the descendant processes of those child processes. A process contract forms a fault boundary around the aggregate descendants of the process holding the contract, permitting that process to contain the impact of software and hardware failures in the aggregate descendants. Specifically, in one embodiment of the invention, a process contract is restricted to the descendants of a single child process of a contract author (i.e., a second process created by the contact's author is either added to the process contract of which the author is a member or to an empty, newly created process contract). In one embodiment of the invention, the effects of any error fatally affecting a process covered by such a process contract are constrained to that process contract.

FIG. 1 shows a mechanism for observing and handling hardware and software failures of aggregate descendant processes in an operating system in accordance with one embodiment of the invention. In general, an application (102) is a computer program designed for use by end users of computer systems (e.g., a spreadsheet, a word processor, an ftp program, a database, an electronic mail program, a web site, etc.). An application (102) is typically executed in the user layer (118) of an operating system and uses certain system resources (not shown) during execution.

System resources (not shown) may be actual devices or other computer hardware managed by the operating system or may be a service provided by the operating system. Examples of system resources include: countable resources (e.g., individual processors, or a set of locked physical memory pages used by a database program); fungible countable resources (e.g., the processors in a processor set); rate-based resources (e.g., bandwidth through an input/output (I/O) channel, through a network interface, or from an encryption/decryption service); continuous amount resources (e.g., memory required in bytes but the operating system may manage in different units); or relationship resources (e.g., resources that may satisfy a mathematical constraint determined by an external agent).

When a change in the availability of the system resources occurs, the application (102) is able to modify its use of these system resources. When an application (102) is executed, at least one process (e.g., Process A (104)) is created. In general, the process is an operating system construct created to execute the application (102) on a computer system.

To use system resources, the process enters into binding relationships with the system resources. The process interacts with a contract subsystem (100) in the kernel layer (120) of the operating system through a contract interface (122) between the user layer (118) and the kernel layer (120) when creating a contract (108) around the binding relationships. This contract enables an exit negotiation (i.e., modification of how an application uses the system resources) when an administrative change is made in the availability of the system resources.

In one embodiment, the collection of descendant processes (e.g., Process B (114), Process C (116)) of a process (e.g., Process A (104)) is treated as a system resource with which a contract (108) may be established. A type of binding relationship between the process (e.g., Process A (104)) and one or more of the process's child processes (e.g., Process B (114), Process C (116)) may be formed when the process (e.g., Process A (104)) executes a fork operation causing a child process (e.g., Process B (114), Process C (116)) to be created.

A contract subsystem (100) and a contract interface (122) provide a framework for creating, managing, and terminating a contract (108) between processes and system resources. In one embodiment, the contract subsystem (100) includes a set of contract templates (106) that are used when creating contracts. In one embodiment, each template in the set of contract templates (106) is associated with a specific type of system resource with which a process (104) may form a contractual relationship. There can be an arbitrary number (including zero) of each type of contract template (106).

Still referring to FIG. 1, each of the contract templates (106) includes terms and events that may be used by a process to define a contractual relationship with the type of system resource associated with one of the contract templates (106). In one embodiment, the terms and events included in the contract templates (106) vary according to the type of the system resource associated with one of the contract templates (106). The events typically represent system actions and errors that affect or potentially affect the binding relationship between a process and the type of system resource associated with one of the contract templates (106). The terms express the operating assumptions of the process as it executes using the system resource. Terms are typically parameters of the contract templates (106) and may be set by the process.

In one embodiment, events are categorized in the contract templates (106) as either informational or critical. Typically, the process may promote an event from informational to critical when defining a contractual relationship. However, depending on the type of the system resource, the ability to make an event critical may be governed by the privilege level of the process.

Still referring to FIG. 1, in one embodiment, the set of contract templates (106) includes a process contract template (not shown) used when creating the contracts (108) between the process (e.g., Process A (104)) and the aggregate descendants of that process. In one embodiment, a process contract template includes the events shown in Table 1. Terms are provided in the process contract template to permit the process creating a process contract to promote informational events to critical events. In addition, terms are provided to permit the process to define which of the critical events are fatal events. Generally, a fatal event causes all members of a process contract to be killed. In one embodiment, a fatal event may optionally cause only those members of the process contract that are in the same process group as the source of the event to be killed.

TABLE 1

| Event Type | Definition |
| --- | --- |
| empty | last member process of the process contract has exited |
| process fork | a new process has been added to the process contract |
| process exit | a member process of the process contract has exited |
| core | a member process has failed in such a way that a core dump occurred or should have occurred |
| signal | a member process received a fatal signal from a non-member process other than the owner of the process contract |
| hardware error | a member process experienced a fatal hardware error |

In one embodiment, the contract interface (122) includes functionality allowing a process (e.g., Process A (104)) to direct the contract subsystem (100) to create a contract (108) using a contract template included in the contract templates (106); to activate a contract template, for automatic creation of a contract when a binding relationship is created; to define the terms of a contract; to retrieve and acknowledge events; and to terminate a contract.

Still referring to FIG. 1, in one embodiment, system resources with which a contract (108) may be established include functionality to receive information from the operating system regarding system actions affecting these system resources and to translate this information into contract events as appropriate. Such system resources also include functionality to interact with the contract subsystem (100) to mark the contract events as informational or critical as specified in the terms of the contract (108) associated with the system resources. In addition, such system resources include functionality to interact with the contract subsystem (100) to place the contract events in the event queue (112) of the contract (108).

A process (e.g., Process A (104)) that owns the contract (108) may retrieve contract events from the event queue (112) in order to handle the events. The contract subsystem (100) may remove informational events from the event queue (112) in first-in, first-out order if the process (e.g., Process A (104)) does not consume informational events as quickly as these events are being produced.

Still referring to FIG. 1, in one embodiment, a contract event in a process contract (108) may also be categorized as a fatal event. The contract subsystem (100) includes functionality to check process contract events for events that are designated as fatal in the process contract terms. In one embodiment, when such an event is found, the contract subsystem (100) marks that event as a fatal event before placing the event in the event queue (112).

Occasionally, a process (e.g., Process A (104)) holding the contract (108) creates a replacement contract (e.g., when restarting a dependent process). For example, if the process (e.g., Process A (104)) receives a signal event indicating that a descendant process (e.g., Process B (114), Process C (116)) has been killed, the process (e.g., Process A (104)) may elect to replace the entire set of descendants with a new set of descendants.

In one embodiment, a contract (108) is established by selecting the contract templates associated with system resources, defining the terms of the desired contract (108) in each of the contract template, and the contract (108) is created using the initialized contract template.

The contract subsystem (100) includes functionality to automatically create a contract (108) using an activated contract template each time a process establishes a binding relationship with a system resource of the type associated with the activated contract template. In one embodiment, a contract template is activated by selecting the contract template associated with the type of system resource with which process will be establishing one or more binding relationships. The terms of the desired contract are defined in the contract template and the template is placed in a state of readiness (i.e., the contract template is activated) and is able to be used when the process (104) actually establishes a binding relationship with the system resource.

As shown in FIG. 1, in one embodiment, the contract subsystem (100) includes functionality to automatically create a process contract (108) using an activated process contract template when a new process is created, such as when Process A (104) executes a fork operation creating a child process (e.g., Process B (114), Process C (116)). The process must first allocate a new process contract template. In one embodiment, the process may use the default terms in the process contract template or modify one or more of the terms.

The process contract template is activated and, once activated, the template is used when the process actually establishes a binding relationship with a system resource. For example, when the process holding an activated process contract template executes a fork operation, a process contract is created and the child process (e.g., Process B (114), Process C (116)) created by a fork operation becomes the first member of the newly created process contract.

In one embodiment, a descendant process (e.g., Process B (114), Process C (116)) may activate a process contract template, as described above. Then, each time the descendant process (e.g., Process B (114), Process C (116)) executes a fork operation, a new process contract owned by the descendant process (e.g., Process B (114), Process C (116)) is created and the child process created by the fork operation is included in the new process contract. If a descendant process (e.g., Process B (114), Process C (116)) does not have an active process contract template, any child processes of that descendant process (e.g., Process B (114), Process C (116)) are included in the process contract of which that descendant process (e.g., Process B (114), Process C (116)) is a member.

In one embodiment, the contract subsystem (100) contains functionality allowing a process to abandon a contract (108) when the process is no longer interested in tracking the associated system resource (e.g., when the process exits). Depending on the type of the associated system resource and the terms of the contract (108), the contract subsystem (100) places an abandoned contract in a dead state or an orphan state. An orphan contract has no owner, and exists solely because of some side effect the contract (108) has on the associated system resource. When the possibility of side effects related to an orphaned contract has been removed, the contract subsystem (100) transitions the orphaned contract to the dead state. Once a contract (108) is in the dead state, the contract subsystem (100) may terminate the contract (108).

In one embodiment, a process contract is always placed in the orphan state when abandoned. An additional term, available in the process contract template, may be set when a process contract is created to indicate that all members of the process contract are to be killed when the process contract is abandoned. In one embodiment, the set of processes which are killed when a process contract is abandoned is limited by what privileges the contract's author had when the contract was created. If all the members of an orphaned process contract are killed or otherwise exit, the contract subsystem (100) may then terminate the process contract.

Descendant processes (e.g., Process B (114), Process C (116)) may also hold contracts with system resources. In one embodiment, a process contract acts as a regent, inheriting the contracts of member processes (e.g., Process B (114), Process C (116)) that have failed. A regent contract retains an inherited contract until a successor member process is created, i.e., the failed member process is restarted. An inherited contract is still valid and the contract subsystem (100) continues to place events in the event queue of an inherited contract even though the process that previously owned the inherited contract has failed. When the failed member process is restarted, the process is free to adopt any contracts inherited by the regent from the failed predecessor process and whether to handle any events in the inherited and now adopted contract that occurred in the interim.

Still referring to FIG. 1, in one embodiment, terms are provided in the process contract template that may be set to indicate that the process contract created from the template may act as a regent contract and/or may be inherited if the process owning the contract fails.

In one embodiment, the contract interface (122) includes functionality allowing administrative access to the contract subsystem (100). System administrators and other users with sufficient system privileges may use this functionality to inspect the state of the contracts, and to monitor contract events.

In one embodiment, the contract subsystem (100) and the contract interface (122) include functionality to collect contract events into queues other than contract event queues and to access those queues. Such queues may include a bundle queue and a process bundle queue. A bundle queue aggregates contract events from all contracts (e.g., Contract A (108), Contract B (114)) in the contract subsystem (100) that are created using the same contract type. A process bundle queue aggregates contract events from all contracts (e.g., Contract A (108), Contract B (114)) held by a process (104) that are created using the same contract type.

In one embodiment, the contract interface (122) is implemented, at least in part, as a pseudo file system. A pseudo file system provides file-like abstractions and file I/O (i.e., input/output) interfaces to system functionality that is not a file in the traditional sense. For example, the /proc pseudo file system in the operating system represents the address space of a process as a series of files.

Figure 2:
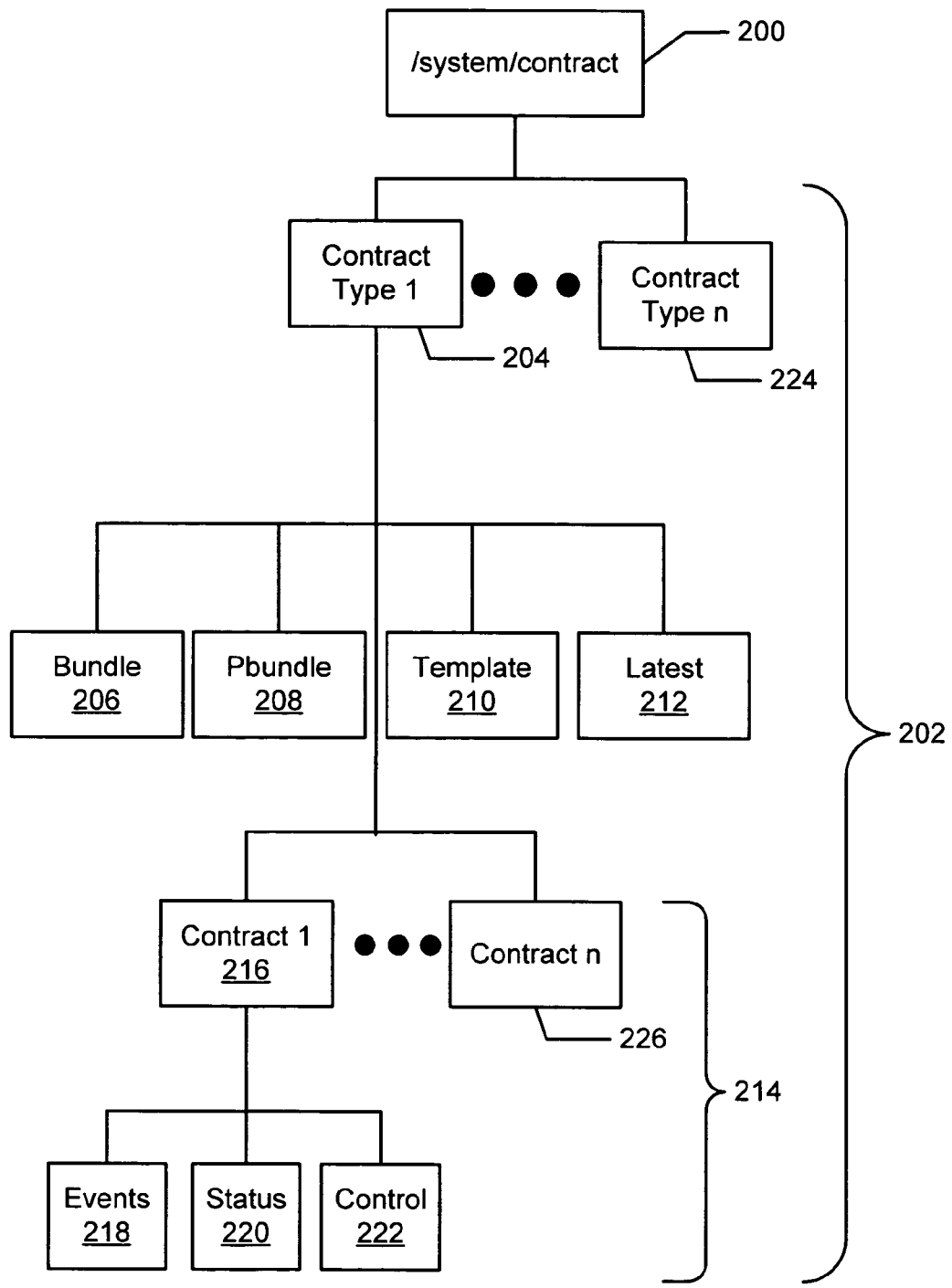
FIG. 2 shows a pseudo file system interface for the contract subsystem in accordance with one embodiment of the invention.

FIG. 2 shows the file hierarchy of a pseudo file system interface for the contract subsystem (100 in FIG. 1) in accordance with one embodiment of the invention. The objects in the contract subsystem (100 in FIG. 1) are treated as files. A combination of standard file system commands (e.g., open, close, etc.) and contract specific commands are provided to access the files in the contract file hierarchy.

The top-level directory (200) of the contract pseudo file system includes subdirectories (202) for each contract type that may be created (e.g., Contract Type 1 (204), Contract Type n (224)) in accordance with one or more embodiments of the invention. Referring specifically to Contract Type 1 (204), the subdirectories (202) include four files: the bundle file (206), the process bundle file (208), the template file (210), and the latest file (212). Opening the template file (210) returns a file descriptor for a new contract template of the type represented by the subdirectory Contract Type 1 (204). Opening the bundle file (206) returns a file descriptor for a bundle event queue which receives events from all contracts on the system of the type represented by the subdirectory Contract Type 1 (204). Opening the process bundle file (208) returns a file descriptor for a process bundle queue which receives events from all contracts held by the opening process that are of the type represented by the subdirectory Contract Type 1 (204). Opening the latest file (212) returns a file descriptor for the status file of the last contract of the type represented by the subdirectory Contract Type 1 (204) written by the process executing the open operation.

As shown in FIG. 2, in one embodiment, Contract Type 1 (204) also includes a variable number of subdirectories (214) corresponding to existing contracts of the type represented by Contract Type 1 (204) (e.g., Contract 1 (216), Contract n (226)). Referring specifically to Contract 1 (216), these subdirectories (214) include three files: the events file (218), the status file (220), and the control file (222). Opening the events file (218) returns a file descriptor for accessing contract events from the event queue of Contract 1 (216). Opening the status file (220) returns a file descriptor for the status file of Contract 2 (216). In one embodiment, the status file (220) includes information regarding the number of unacknowledged critical events pending in the event queue, the remaining negotiation time if a negotiation is underway, the time remaining before the current negotiation quantum runs out, etc.

Opening the control file (222) returns a file descriptor for the control file of Contract 1 (216). In one embodiment, the control file (222) operates as a control point for a process (e.g., Process A (104) in FIG. 1) to direct the contract subsystem (100 in FIG. 1) to perform control operations on the contract represented by Contract 1 (216). These control operations include adopting the contract, abandoning the contract (i.e., terminating the contract), acknowledging a critical event, acknowledging a negotiation event to allow the system to proceed with the action triggering the negotiation event, requesting a new time quantum for a negotiation, and instructing the contract subsystem (100 in FIG. 1) that when the current exit negotiation completes, another contract is to be established.

Figure 3:
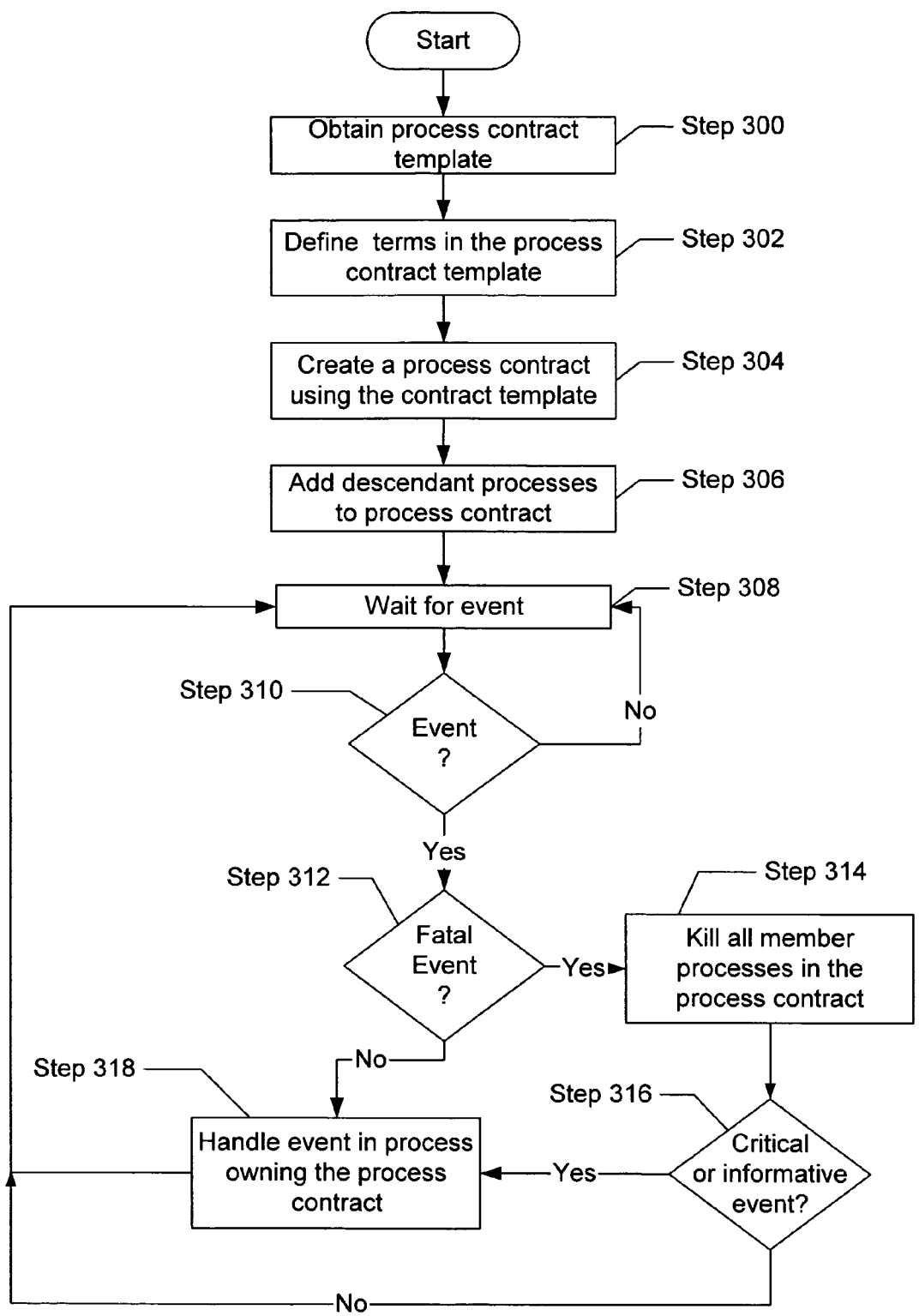
FIGS. 3, 4, and 5 show flowcharts in accordance with one or more embodiments of the invention.

FIG. 3 shows a method for handling events in aggregate descendants of a process in accordance with one embodiment of the invention. Initially, a process contract template is obtained (Step 300) and the terms of the process contract are defined in the template (Step 302). In one embodiment, the terms of the process contract are defined by setting the terms in the contract template to indicate which of the events in the process contract are be treated as informational and which are to be treated as critical. In one embodiment, some events may be designated as fatal events. A process contract is then created using the initialized process contract template (Step 304). In one embodiment, the process contract is created when the process executes a fork operation to create a child process.

Once the process contract is created, the child process is added to process contract (Step 306). In one embodiment of the invention, descendant processes (i.e., descendants of the child process) may also be added to the process contract if their parent processes were members of the process contract and did not have active process contract templates. As mentioned above, one occasion when descendent processes are added is during a fork operation.

Figure 4:
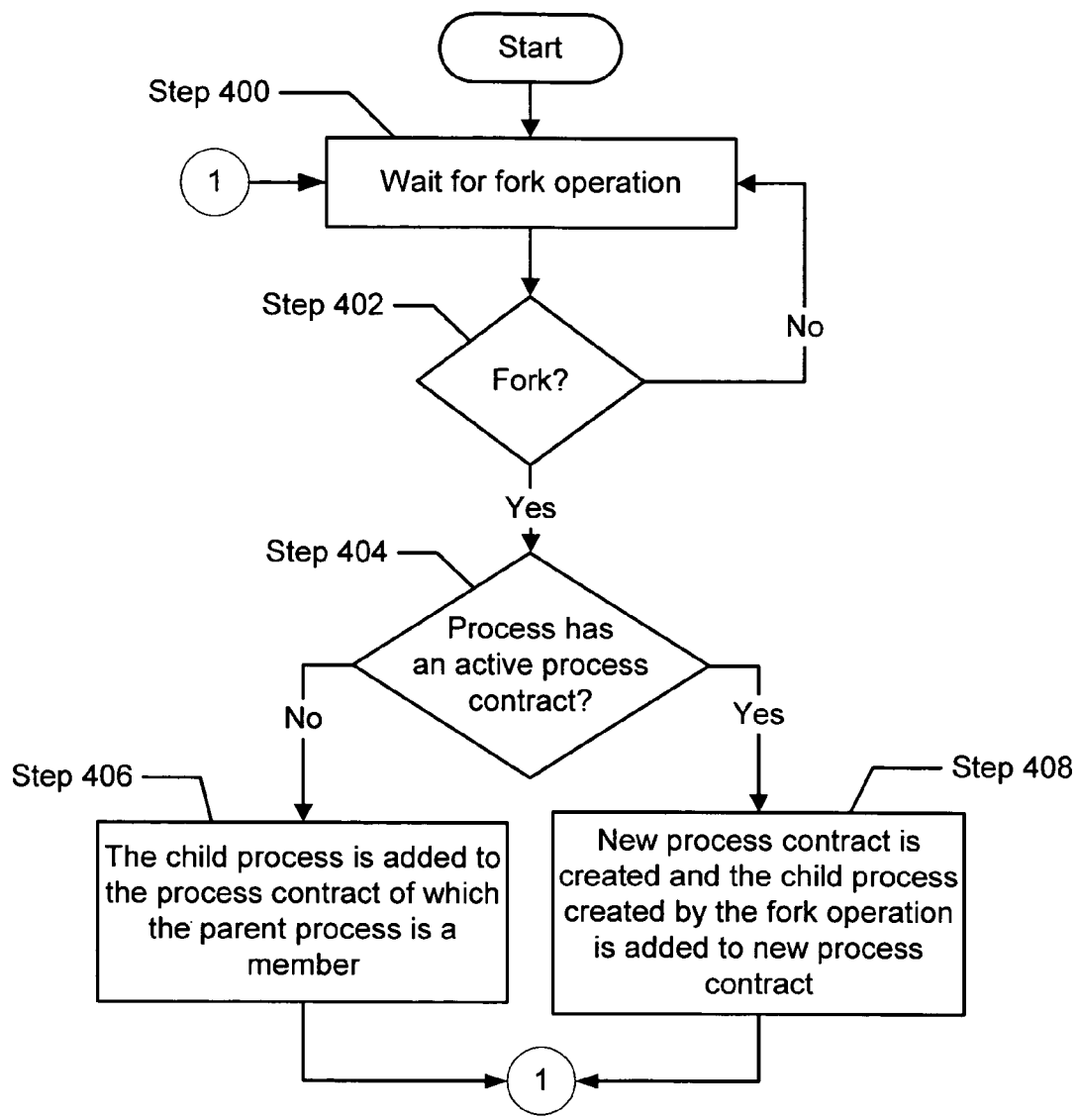

FIG. 4 shows a method for adding descendant processes to a process contract in accordance with one embodiment of the invention. When adding descendant processes, a system waits for a fork operation (Step 400). When the fork operation is executed in a process (Steps 402), a determination whether the process has an active process contract template (Step 404). If the process has an active process contract template, then a new process contract is created and the child process created by the fork operation is added to that new process contract (Step 408). If the parent process does not have an active process contract template, then the child process is added to the process contract of which the parent process is a member (Step 406) (if such a process contract exists). The above steps are repeated each time a process is created within the system.

Referring back to the method of FIG. 3, once a process contract is created, the system monitors and waits for events affecting the processes in the process contract (Step 308). If an event identified in the process contract occurs (Step 310), a determination is made whether the event is a fatal event according to the terms of the contract (Step 312).

If the event is a fatal event, all member processes in the process contract are killed (Step 314). In one embodiment, optionally, only those member processes that are members of the same process group are killed. Next, a determination is made whether the event is considered in the critical or information event set (Step 316). If so, the event may be handled in the process owning the process contract (Step 318). Otherwise, monitoring and waiting for additional events then resumes at Step 308. In one embodiment, the process may delay handling the event for some time period and continue monitoring for and handling other events in the interim.

Figure 5:
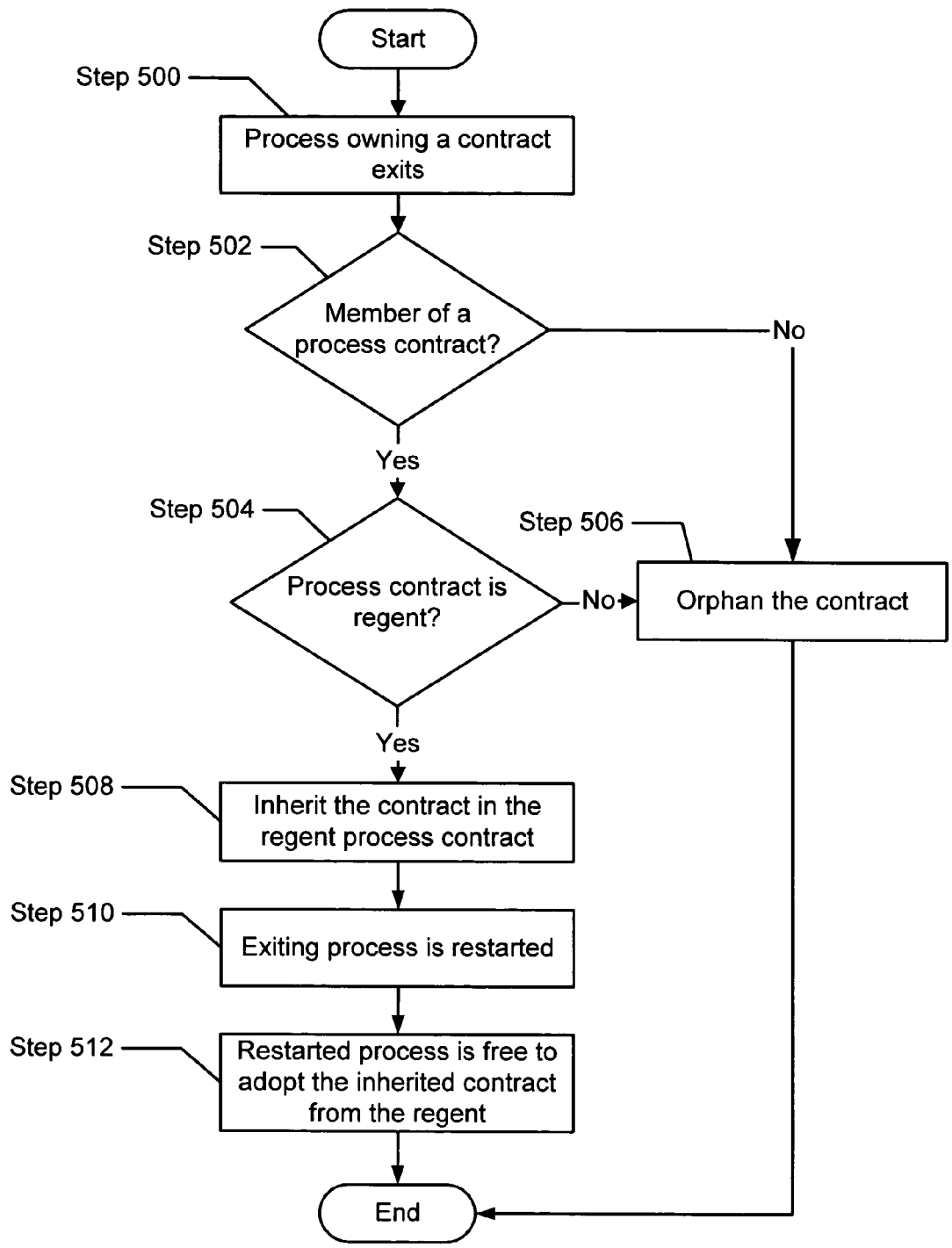

FIG. 5 shows a method for retaining a contract when the process owning the contract exits and is restarted in accordance with one embodiment of the invention. When a process owning a contract of any type exits (Step 500), a determination is made whether the process is a member of a process contract (Step 502). If not, the contract is orphaned (Step 506). If the process is a member of a process contract, a determination is made whether that process contract is a regent and as to whether the contract is inheritable (Step 504). If not, the contract is orphaned (Step 506). If the process contract is a regent and the contract is inheritable, then the process contract inherits the contract owned by the exiting process (Step 508). The contract remains active and any events related to that contract are retained. When process that exited is subsequently restarted (Step 510), the restarted process is free to adopt the inherited contract from the regent process contract and becomes the owner of the contract (Step 512). Once adopted, the restarted process then begins handling any accumulated contract events.

One or more embodiments of the invention allow for the efficient implementation of application availability frameworks on networked computer systems for operating systems implementing the operating system process model. Embodiments of the invention enable tracking of all of the descendants of an application's initial process through one or more process contracts. The process owning a process contract acts as an error recipient for descendants of the process included in the process contract and handles those errors, as needed.

Among the actions the owning process may take to handle errors is to kill all member processes in response to a fatal error. The owning process may also elect to restart member processes that have exited. Further, if a process owning a contract of any type exits, that contract may be inherited by a process contract of which the exiting process is a member. Events affecting the contracted resource are collected and retained in the contract even though the owning process is gone. If that process is then restarted, the restarted process may adopt the contract and resume handling the accumulated events. This inheritance/adoption mechanism permits a very robust tree of processes, e.g., a process where multiple sessions can fail and restart and pick up all previous sessions.

Figure 6:
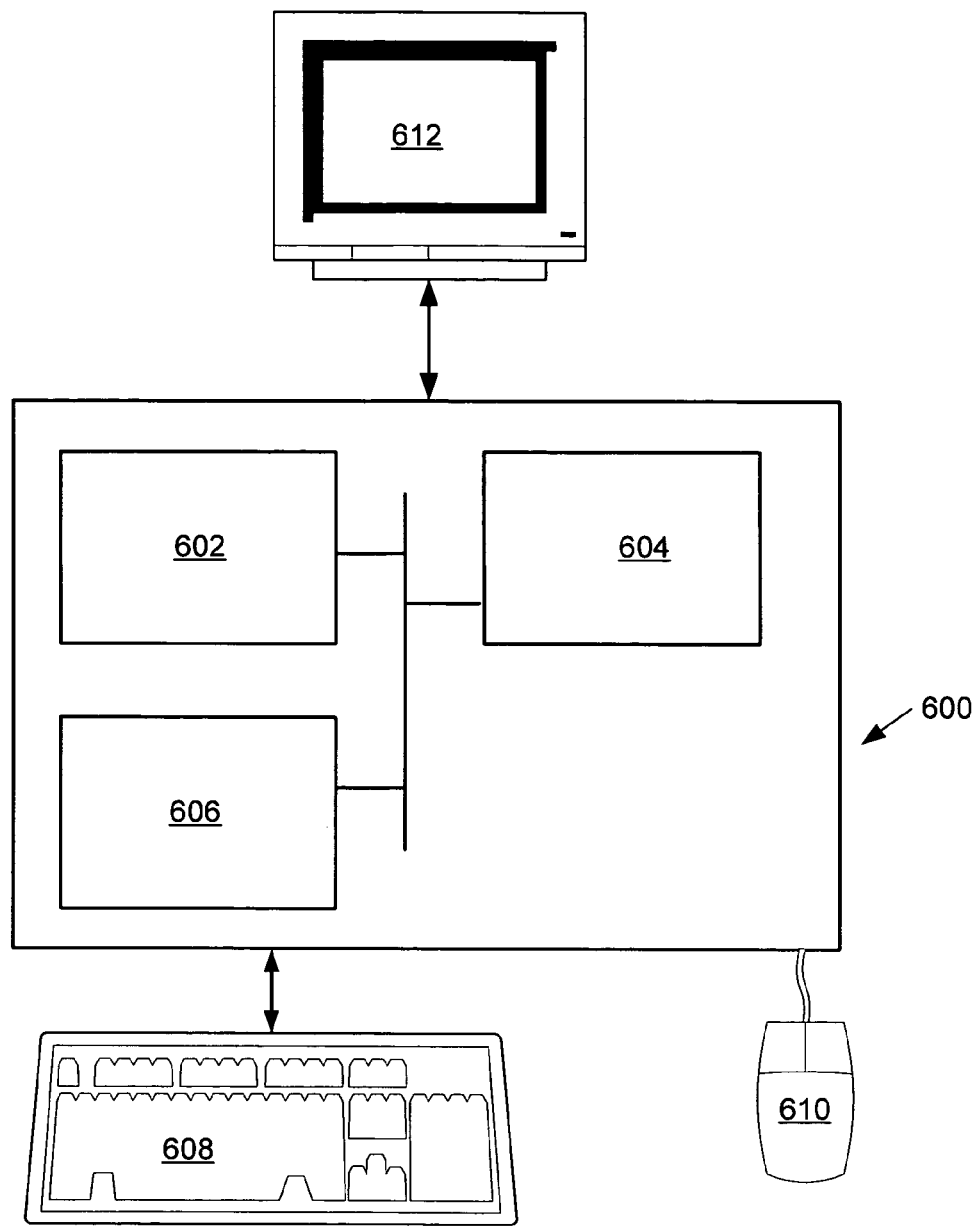
FIG. 6 shows a computer system in accordance with one embodiment of the invention.

An embodiment of the invention may be implemented on virtually any type of computer regardless of the platform being used. For example, as shown in FIG. 6, a computer system (600) includes a processor (602), associated memory (604), a storage device (606), and numerous other elements typical of today's computers (not shown). The computer system (600) may also include additional processors (not shown). The computer (600) may also include input means, such as a keyboard (608) and a mouse (610), and output means, such as a monitor (612). The networked computer system (600) is connected to a local area network (LAN) or a wide area network via a network interface connection (not shown). Those skilled in the art will appreciate that these input and output means may take other forms. Further, those skilled in the art will appreciate that one or more elements of the aforementioned computer (600) may be located at a remote location and connected to the other elements via a network.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for handling events comprising:
   creating a process contract by a first process, wherein the first process is an owner of the process contract, wherein the process contract defines how to handle at least one type of event;
   executing a first operation by the first process, wherein a second process is created by the first operation;
   adding the second process to the process contract as a descendent process of the owner, wherein the second process is added based on the creation of the second process by the first process;
   receiving a first event affecting the second process after the second process is added to the process contract, wherein the first event is of the at least one type of event;
   identifying the process contract associated with the second process;
   determining, using the process contract, whether the first event is a fatal event;
   killing the second process when the first event is a fatal event;
   determining whether the process contract requires the owner to handle the event; and
   handling the first event in the first process when required by the process contract.

2. The method of claim 1, wherein handling the first event comprises restarting the second process.

3. The method of claim 1, further comprising:
   executing a second operation in the descendant process of the first process, wherein a third process created by the second operation is added to the process contract;
   receiving a second event affecting the third process in the process contract;
   handling the second event in the first process; and
   killing the second process and the third process when the second event is a fatal event.

4. The method of claim 3, wherein the second operation is a fork operation.

5. The method of claim 1, wherein the first operation is a fork operation.

6. The method of claim 1, further comprising:
   inheriting at least one contract owned by the second process when the second process exits, wherein the process contract inherits the at least one contract.

7. The method of claim 6, wherein the first event indicates that the second process has exited, and handling the first event comprises restarting the second process, wherein the restarted second process is free to adopt the at least one contract owned by the second process.

8. The method of claim 6, wherein inheriting the at least one contract owned by the second process comprises inheriting the at least one contract when the second process exits, if the process contract is a regent.

9. The method of claim 6, wherein inheriting the at least one contract owned by the second process comprises orphaning the at least one contract when the second process exits, if the process contract is not a regent.

10. A method for handling events in aggregate descendants comprising:
    creating a process contract for a process, wherein the process is an owner of the process contract, wherein the process contract defines how to handle at least one type of event;
    adding a plurality of descendant processes to the process contract, wherein the plurality of descendent processes are added as descendents of the owner;
    receiving a plurality of events affecting the plurality of descendant processes after the plurality of descendent processes are added to the process contract, wherein the plurality of events are of the at least one type of event;
    handling the plurality of events in the process when required by the process contract;

receiving a fatal event affecting a descendant process in the plurality of descendant processes, wherein the fatal event is defined as a fatal event by the process contract; and killing at least one of the plurality of descendant processes based on the process contract.

11. The method of claim 10, wherein handling the plurality of events comprises restarting a descendant process of the plurality of descendant processes.

12. A computer system enabled to handle events in aggregate descendants, comprising:

a processor;

a memory operatively connected to the processor; and software instructions stored in the memory for enabling the computer system to:

create a process contract by a first process, wherein the first process is an owner of the process contract, wherein the process contract defines how to handle at least one type of event;

execute a first operation in the first process, wherein a second process is created by the first operation;

add the second process to the process contract as a descendent process of the owner, wherein the second process is added based on the creation of the second process by the first process;

receive a first event affecting the second process after the second process is added to the process contract, wherein the first event is of the at least one type of event;

identify the process contract associated with the second process;

determine, using the process contract, whether the first event is a fatal event;

kill the second process when the first event is a fatal event;

determine whether the process contract requires the owner to handle the event; and handle the first event in the first process when required by the process contract.

13. The computer system of claim 12, wherein the software instructions that handle the first event comprise software instructions to restart the second process.

14. The computer system of claim 12, wherein the software instructions further enable the computer system to:

execute a second operation in the descendant process of the first process, wherein a third process, created by the second operation, is added to the process contract;

receive a second event affecting the third process in the process contract; and handle the second event in the first process.

15. The computer system of claim 14, wherein the software instructions further enable the computer system to kill the second process and the third process when the second event is a fatal event.

16. The computer system of claim 12, wherein the software instructions further enable the computer system to inherit at least one contract owned by the second process when the second process exits, wherein the process contract inherits the at least one contract.

17. The computer system of claim 16, wherein the first event indicates that the second process has exited, and handling the first event comprises restarting the second process, wherein the restarted second process is free to adopt one or more of the at least one contract owned by the second process.

18. The computer system of claim 16, wherein the first event indicates that the second process has exited, and handling the first event comprises restarting the second process, wherein the restarted second process is free to adopt the inherited contract of the second process.

19. The computer system of claim 16, wherein the software instruction to inherit the at least one contract owned by the second process comprises inheriting the at least one contract when the second process exits, if the process contract is a regent.

20. The computer system of claim 16, wherein the software instruction to inherit the at least one contract owned by the second process comprises orphaning the at least one contract when the second process exits, if the process contract is not a regent.

* * * * *